Reissued Dec. 21, 1937

Re. 20,596

UNITED STATES PATENT OFFICE 20,596

PROCESS FOR MANUFACTURING MOTOR FUEL

Jack Francis Mahon Taylor and Bernard Sutro Greensfelder, San Francisco, and Russell Norman Shiras, Long Beach, Calif., assignors, by direct and mesne assignments, of one-half to Shell Development Company, San Francisco, Calif., a corporation of Delaware, and one-half to Phillips Petroleum Company, Bartlesville, Okla., a corporation of Delaware No Drawing. Original No. 2,055,455, dated September 22, 1936, Serial No. 607,010, April 22, 1932. Application for reissue October 4, 1937, Serial No. 167,250

11 Claims. (Cl. 44—9)

This invention relates to a process of manufacturing hydrocarbon motor fuel from mineral hydrocarbon oils and is more particularly concerned with the production of light motor fuels of superior quality.

It is the main object of this invention to provide a method for producing by physical treatment of raw material a product which would be far superior to the product normally obtained from the same raw stock. Some of the most important properties of the light motor fuels upon which the value of these materials are based, are: anti-knock property, vapor pressure and volatility. It is the particular object of this invention to provide a process whereby it becomes possible so to control the production of the final material that any desirable combination of these properties within comparatively wide limits can be obtained. The great importance attached to the anti-knock rating of a motor fuel is well known, while the means for developing this property are limited to only a few generally known methods, such as cracking, hydrogenation, or suppressing the knocking tendency of a fuel by adding one of a number of knock inhibitors, e. g. tetra-ethyl lead, aniline, carbonyls of iron or nickel, etc., whose sole purpose, when added to the gasoline, is to increase its anti-knock rating.

Being effective for this purpose to various degrees these compounds possess certain disadvantages such as toxic effects, tendencies to crystallize out at low temperatures, to form sludges or coatings in or on the engine, to cause deposition of gums from the fuels, or to corrode parts of the apparatus. There has been, therefore, a constant trend in the art to develop a process for obtaining an anti-knock fuel without adding any foreign material, and investigators have turned more and more to the processes effecting certain changes in the constitution of mineral oils, which processes afford great possibilities in the field of producing the non-detonating fuels of high quality without employment of the extraneous agents.

These general methods of raising the anti-knock ratings of gasolines are all improved upon by the instant invention, insofar as it provides a method for further raising the anti-knock ratings of gasoline with simultaneous decrease in vapor pressure, if desired, and/or increase in volatility. The vapor pressure of a motor fuel, as measured under specific conditions, determines the tendency of this fuel to cause vapor lock; it is extremely desirable, therefore, to produce a fuel with as low a vapor pressure as possible. On the other hand the requirement of a certain degree of volatility, as commonly measured by the 10% distillation point, in order to insure quick starting of the motor at low temperature, sets a minimum limit beyond which the vapor pressure cannot be reduced. In the manufacturing of the light motor fuels the efforts are directed, therefore, to produce low vapor pressure materials of high volatility. These conditions when properly balanced set a limit to the amount of light fractions, such as propane and butanes, which may be incorporated in the final product; the presence of these components in the gasoline, however, is very beneficial due to their high anti-knock values. It is the present practice, therefore, to compromise in meeting the opposing requirements of vapor pressure, volatility and anti-knock rating by incorporating into commercial gasolines as much of these light hydrocarbons as is permissible by the vapor pressure limitations.

The present invention solves the problem of successfully meeting the above mentioned requirements in a new and unique manner.

We have discovered that the lighter hydrocarbons normally present in motor fuels may be dealt with in a particular manner. This involves separation by fractional distillation into groups possessing well-defined influences upon the final character of the fuel, and subsequent selection and recombination to yield a product superior to the original in one or more of the three properties mentioned, while maintaining the other(s) equalized.

Knowing the limiting vapor pressure, it may be calculated from known laws that certain light fractions of superior anti-knock value may be substituted for butanes and lighter to maintain or increase the knock rating and volatility while decreasing the vapor pressure. Or, secondly the pentanes and lighter may be removed and the specified fractions added in amount calculated to maintain a limiting vapor pressure while increasing the anti-knock value and volatility.

The light fractions suitable for this purpose must necessarily have a vapor pressure lower than normal butane and an antiknock value in excess of normal pentane.

Briefly, our process consists of treating by physical means a hydrocarbon distillate in such a manner that the concentration of the components having high anti-knock ratings is increased with resultant improvement in the anti-knock rating of the distillate. In some cases this treatment may comprise the removal of one or more of the undesirable components from the distillate being treated, while in others it may involve a combination of steps such, for example, as: first, distilling out fractions containing the compounds of high pro-knock values; second, concentrating by efficient fractionation into narrow boiling fractions, one or more compounds having comparatively high anti-knock ratings and low vapor pressures, and third, blending these narrow boiling fractions with the residual portion of the original distillate which remained after the undesired detonating and/or high vapor pressure compounds were removed.

Accordingly, we can successfully treat by our method any mineral oil distillate either derived from a natural gas, or crude oil, or shale, or produced by one of the commercial processes such as pyrogenetic treatment or hydrogenation of the carbonaceous materials, including petroleum oils and fractions, derivatives, and mixtures of fractions and derivatives of such oils. Various properties of the treated distillate may be further modified by adding thereto one or more of the substances generally known as dopes.

As a matter of illustration, and in order to describe more fully one form of our invention, the following specific example of manufacturing a motor fuel of the improved quality is set forth.

In this particular case, a normal aviation gasoline fraction was produced from natural gasoline. This fraction was dephlegmated or topped, at 50° C. still head temperature to effect substantial removal of the light hydrocarbons including propane, butanes and pentanes. The collected distillate was then fractionated and the fraction boiling at substantially 28–32° C. separated; this fraction in which the iso-pentane predominated to a large extent is hereafter called iso-pentane fraction; as manufactured, it had a markedly low vapor pressure, viz, 255 mm. at 0° C., as compared to that of the next lower boiling component, n-butane, having vapor pressure 770 mm. at 0° C.; furthermore, it had a remarkably high anti-knock rating of 84 octane number, when compared to the next higher boiling n-pentane fraction which has been removed from gasoline and had the octane number of about 60. These two properties, viz, low vapor pressure and high anti-knock rating, render the iso-pentane fraction a very desirable substitute for the n-pentane, and butane and lighter fractions in the finished gasoline. It is worthy of special note that the low vapor pressure of this fraction, or that of the pure iso-pentane, makes possible their use in large proportions in various fuel mixtures without an excessive rise in the vapor pressure of the resulting product, but with the corresponding marked increase in the volatility and anti-knock rating. The specific information relative to this particular illustrative case follows:

| Inspection | Regular gasoline | Topped gasoline | Blended gasoline: 26% iso-pentane fraction 74% topped gasoline |
|---|---|---|---|
| Specific gravity 60° F | .7309 | .7420 | .7139 |
| A. S. T. M. distillation: | | | |
| I. B. P | 47 | 77 | 40 |
| 10% | 75 | 86 | 60 |
| 50% | 94 | 96 | 87 |
| 90% | 114 | 114 | 113 |
| F. B. P | 140 | 139 | 137 |
| Percent distilled | 98 | | 97.5 |
| V. P. Reid at 100° F. lbs. | 5.2 | | 5.2 |
| Octane Nbr. Delco at 212° F | 70.2 | | 74.0 |

This illustrative example shows the manner in which the anti-knock rating and volatility of a gasoline has been increased by selective fractionation of the raw stock and subsequent compounding of the finished product.

The iso-pentane fraction which can be used for improving the properties of a gasoline may be defined by its composition which may be determined from the distillation in an efficient fractionating apparatus, and can be produced from various sources, such as natural gas, crude oil, products of cracking and hydrogenation, chemical synthesis, etc. In general, it preferably should contain at least 60% (mol. basis) of iso-pentane (B. P. 27.95° C.), the balance consisting of the slightly lower and higher boiling hydrocarbons; it is preferable, however, to employ fractions containing over 80% (mol. basis) iso-pentane, which fractions, being obtainable without difficulty, are very effective in producing gasolines of higher volatility and anti-knock rating, and comparatively low vapor pressure.

Aside from blending the iso-pentane, or iso-pentane fraction, with the topped gasoline from which they may have been separated, these materials, i. e., iso-pentane, or iso-pentane fraction, can be admixed in concentrated or somewhat diluted form with the correspondingly favorable results, as knock suppressors to the gasolines of entirely different origin. Thus, the iso-pentane fractions derived from the natural gasoline can be blended either with a cracked or a straight run distillate to produce gasolines of improved qualities, and vice versa.

While we have illustrated the operation of our process by a specific example hereinbefore described, we do not intend to limit ourselves to the particular details thereof, as we have discovered that it is possible to successfully reduce by efficient fractionation, the content of such fractions in a gasoline distillate as those substantially comprising normal paraffin hydrocarbons such as n-hexane, n-heptane, etc., when these are present in appreciable quantities, so that their removal would markedly improve the anti-knock rating of the finished product.

In practice, we found, the removal of these hydrocarbons from a distillate may be considered satisfactory, or effective, when the fractions boiling within an A. S. T. M. range of about 10° C. and having end points about 1° C.–5° C. above the true B. P. of the corresponding normal hydrocarbons are removed from this distillate. The separation of these fractions can be conveniently carried out either while the distillate is produced, or by subsequent refractionation of the distillate in one or a number of operations. Some of the resulting fractions may be found in some cases to be contaminated with the valuable unsaturated, aromatic, or naphthenic compounds which should be retained in the motor fuel oil; the ordinary distillation was found to be ineffective in some of these cases to separate certain azeotropic mixtures, such, for example, as n-heptane, toluene and cycloheptane; to accomplish this separation, the extraction with liquid $SO_2$ was employed and the extract substantially freed of straight chain paraffin hydrocarbon was returned to the treated distillate.

Ordinarily, however, it was found sufficiently effective to employ fractionation as a means for improving the anti-knock rating of the liquid fuel by removing therefrom some of the normal hydrocarbons. In order to ascertain the portions which may be advantageously removed from a distillate, we analyze quantitatively, physically by means of fractionation, extraction, etc., and/or chemically by nitration, sulphonation, etc., the said distillate, especially with regard to the hydrocarbons having markedly low or markedly high anti-knock rating. Knowing from these analyses that certain normal hydrocarbons are present in the distillate in comparatively large quantities, the narrow-boiling fractions containing said hydrocarbons are fractionated out in the experimental equipment and the effect of their removal on the anti-knock rating is determined by actual tests, from which the advisability of processing the original distillate on commercial scale can be determined. In one case, two fractions boiling respectively at 60–70° C. and 90–97° C. were separated from a distillate; they constituted 5% and 1% by volume of the original distillate, and contained about 60% mol., n-$C_6H_{14}$ and 10% mol. n-$C_7H_{16}$, respectively; their knock-ratings expressed as octane numbers were 50 and 52. From this data the removal of the n-heptane cut did not appear worthwhile with this particular gasoline, the n-hexane cut, however, was removed successfully, raising the octane number of the remaining gasoline from 65 to 67. As the compositions of different mineral oils vary within wide limits, cases have been encountered in practice in which either the heavier n-hydrocarbons, such as n-heptane, n-octane, etc., were present in sufficiently large quantities to warrant their removal, or the combined effect of removing several fractions containing normal hydrocarbons was great enough to justify the expense of the fractionating operation. The removed portions do not constitute a waste in the refining industry, as they can be readily marketed as special solvents, blended with fuels not requiring a high anti-knock rating, etc.

While we have herein fully described the general principle of our invention, and have illustrated the specific manner in which our process can be carried out it is to be distinctly understood that the particulars disclosed and referred to, have been introduced only by way of example, and that the process may be carried out under conditions somewhat different from those definitely stated in said examples without departing from the spirit or scope of the appended claims.

We claim as our invention:

1. A process for manufacturing an anti-knock fuel of relatively low vapor pressure, comprising removing by distillation a portion of the material containing hydrocarbons lower than and including n-pentane, separating from the produced distillate the iso-pentane fraction, and returning the same to the residue from the first distillation.

2. A process of increasing the volatility and anti-knock rating of a motor fuel distillate comprising distilling off the lighter portion of the distillate boiling up to and including n-pentane, and adding to the residual portion a sufficient quantity of the iso-pentane fraction to obtain finished product having substantially the same vapor pressure as the original distillate and a higher anti-knock rating.

3. A process of increasing the volatility and anti-knock rating of a motor fuel distillate without increasing its vapor pressure, comprising distilling off the lighter portion of the distillate boiling up to and including n-pentane, and adding to the residual portion of the distillate a sufficient quantity of the iso-pentane fraction to restore vapor pressure of the finished product and enhance its anti-knock rating.

4. In the process of manufacturing a motor fuel of the type of commercial gasolines, which gasolines normally contain pentanes and the lighter hydrocarbons responsible for the effective vapor pressure thereof, the steps comprising producing by fractionation of a hydrocarbon mixture a fraction boiling within a gasoline range and free of pentanes and the lighter hydrocarbons, and therefore having a relatively low vapor pressure, then incorporating into the said fraction a sufficient quantity of iso-pentane to raise its vapor pressure to correspond to that of the commercial gasoline normally containing pentanes and the lighter hydrocarbons.

5. In the process of manufacturing a gasoline having a vapor pressure of about 5 lbs./sq. in. at 100° F. and whose initial boiling point is about 40° C., the steps which comprise producing a hydrocarbon mixture free of n-pentane, n-butane and the lighter hydrocarbons, thereby causing the vapor pressure to be substantially below 5 lbs./sq. in. at 100° F., and the initial boiling point to be substantially above 40° C., and then incorporating a sufficient quantity of an iso-pentane fraction into the said mixture to raise the vapor pressure of the mixture to about 5 lbs./sq. in. at 100° F. and to lower its initial boiling point to about 40° C.

6. In the process of manufacturing a gasoline having a relatively high anti-knock value, the steps which comprise fractionating a hydrocarbon mixture to produce a hydrocarbon fraction substantially free from n-pentane and the lighter hydrocarbons, and having a relatively low anti-knock rating and the end point of gasoline and incorporating with said fraction a quantity of iso-pentane to raise the vapor pressure of the fraction to that of gasoline and raise its anti-knock rating.

7. A gasoline whose active fuel component consists of a mixture of a hydrocarbon fraction containing saturated and unsaturated hydrocarbons boiling within the gasoline range, and which is substantially free of the normal hydrocarbons containing less than six carbon atoms in a molecule, said fractions having a vapor pressure lower than that of the normal gasoline and a quantity of an iso-pentane fraction which is in excess of that normally present in the gasoline and is sufficient to raise the vapor pressure of the fuel to that of the normal gasoline and to enhance its anti-knock rating.

8. A gasoline whose active fuel component consists of a mixture of a hydrocarbon fraction containing saturated and unsaturated hydrocarbons boiling within the gasoline range, and which is substantially free of the normal hydrocarbons containing less than six carbon atoms in a molecule, said fraction having a vapor pressure lower than that of the normal gasoline, and a quantity of an iso-pentane fraction in excess of that normally present in the gasoline and sufficient to raise the vapor pressure of the fuel to that of the normal gasoline and enhance the anti-knock rating.

9. A gasoline motor fuel of relatively high anti-knock value and normal vapor pressure whose normally light hydrocarbon constituents of less than six carbon atoms have been removed by distillation and replaced by another light hydrocarbon fraction comprising substantially iso-pentane.

10. A gasoline whose active fuel component consists of a mixture of a hydrocarbon fraction containing hydrocarbons boiling within the gasoline range, and which is substantially free of the normal hydrocarbons containing less than six carbon atoms in a molecule, said fractions having a vapor pressure lower than that of the normal gasoline and a quantity of an iso-pentane fraction which is in excess of that normally present in the gasoline and is sufficient to raise the vapor pressure of the fuel to that of the normal gasoline and to enhance its anti-knock rating.

11. A gasoline whose active fuel component consists of a mixture of a hydrocarbon fraction comprising saturated hydrocarbons boiling within the gasoline range, and which is substantially free of the normal hydrocarbons containing less than six carbon atoms in a molecule, said fractions having a vapor pressure lower than that of the normal gasoline and a quantity of an iso-pentane fraction which is in excess of that normally present in the gasoline and is sufficient to raise the vapor pressure of the fuel to that of the normal gasoline and to enhance its anti-knock rating.

JACK FRANCIS MAHON TAYLOR.
BERNARD SUTRO GREENSFELDER.
RUSSELL NORMAN SHIRAS.